(12) United States Patent
Saito et al.

(10) Patent No.: US 9,593,190 B2
(45) Date of Patent: Mar. 14, 2017

(54) METHOD FOR PRODUCING FLUORINATED POLYMER

(71) Applicant: Asahi Glass Company, Limited, Chiyoda-ku (JP)

(72) Inventors: Susumu Saito, Tokyo (JP); Tetsuji Shimohira, Tokyo (JP); Kazuo Hamazaki, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/946,159

(22) Filed: Nov. 19, 2015

(65) Prior Publication Data

US 2016/0075804 A1    Mar. 17, 2016

Related U.S. Application Data

(63) Continuation of application No. PCT/JP2014/066575, filed on Jun. 23, 2014.

(30) Foreign Application Priority Data

Jul. 3, 2013   (JP) .................................. 2013-139999

(51) Int. Cl.
 *C08F 214/18* (2006.01)
 *C08F 214/26* (2006.01)
 *C08F 114/18* (2006.01)
 *C08F 114/26* (2006.01)

(52) U.S. Cl.
 CPC ........ *C08F 214/262* (2013.01); *C08F 114/18* (2013.01); *C08F 114/26* (2013.01); *C08F 214/18* (2013.01); *C08F 214/26* (2013.01)

(58) Field of Classification Search
 CPC .... C08F 114/18; C08F 114/26; C08F 214/18; C08F 214/26; C08F 214/262
 See application file for complete search history.

(56) References Cited

U.S. PATENT DOCUMENTS

| | | | | |
|---|---|---|---|---|
| 5,283,304 A * | 2/1994 | Nakabayashi | ...... | C08F 214/186 526/245 |
| 2005/0191578 A1* | 9/2005 | Araki | ................... | C08F 214/18 430/270.1 |
| 2008/0193821 A1 | 8/2008 | Shimohira et al. | | |
| 2008/0293863 A1* | 11/2008 | Otozawa | ................. | C08F 14/18 524/366 |
| 2009/0004527 A1* | 1/2009 | Shimohira | .............. | C08F 20/22 429/493 |
| 2009/0048424 A1* | 2/2009 | Watakabe | ............ | C07D 317/42 528/391 |
| 2009/0187044 A1* | 7/2009 | Kaneko | ................. | C07C 303/22 562/825 |
| 2009/0227749 A1 | 9/2009 | Tayanagi et al. | | |
| 2011/0071272 A1 | 3/2011 | Watakabe et al. | | |
| 2011/0269911 A1* | 11/2011 | Morita | .................. | C08F 214/22 525/326.2 |
| 2013/0345443 A1 | 12/2013 | Watakabe et al. | | |
| 2015/0183946 A1* | 7/2015 | Saito | .......................... | C08J 5/22 521/27 |
| 2016/0075804 A1* | 3/2016 | Saito | ................... | C08F 214/262 524/851 |

FOREIGN PATENT DOCUMENTS

| | | |
|---|---|---|
| CN | 101693215 A | 4/2010 |
| JP | 6-199959 | 7/1994 |
| JP | 2008-202039 | 9/2008 |
| JP | 2009-040909 | 2/2009 |
| JP | 2009-209365 | 9/2009 |
| JP | 2010-018674 | 1/2010 |
| JP | 4946009 | 3/2012 |

OTHER PUBLICATIONS

"Twenty Years of Ozone Decline: Proceedings of the Symposium for the 20th Anniversary of the Montreal Protocol" by Zerefos et al. obtained from: https://books.google.com/books?id=qolxLN61XHIC&pg=PA436&lpg=PA436&dq=HCFC+225cb+boiling&source=bl&ots=t6EjdTP3gN&sig=npTMkpd2jg-6yOWFOxL8SukFT_w&hl=en&sa=X&ved=0ahUKEwjMoo2qldLLAhXKpx4KHXXtDfQQ6AEIHTAA#v=.*
English translation of CN101693215, which was referenced by applicant in the Sep. 30, 2016 IDS. Obtained from Google on Oct. 26, 2016.*
International Search Report issued Sep. 22, 2014 in PCT/JP2014/066575, filed on Jun. 23, 2014.

* cited by examiner

*Primary Examiner* — Michael A Salvitti
(74) *Attorney, Agent, or Firm* — Oblon, McClelland, Maier & Neustadt, L.L.P.

(57) ABSTRACT

A method for producing a fluorinated polymer, which comprises carrying out polymerization in a container capable of polymerizing a monomer in a pressurized state, in the presence of at least one of specific four organic peroxides, in a polymerization medium containing at least one fluorinated solvent (B) having a boiling point at normal pressure of at most 60° C., using at least a fluorinated monomer (C) having a boiling point at normal pressure higher than said fluorinated solvent (B), and tetrafluoroethylene, at a temperature of at most 70° C. and at least the boiling point at normal pressure of a fluorinated solvent (B) having the lowest boiling point at normal pressure among said fluorinated solvent (B).

20 Claims, No Drawings

METHOD FOR PRODUCING FLUORINATED POLYMER

TECHNICAL FIELD

The present invention relates to a method for producing a fluorinated polymer.

BACKGROUND ART

A fluorinated polymer having carboxylic acid type functional groups or sulfonic acid type functional groups is known as a material for ion-exchange membranes (ion exchange membranes for electrolysis of an alkali chloride, electrolyte membranes for fuel cells, etc.).

Such a fluorinated polymer is obtainable, for example, by polymerizing a fluorinated monomer having a carboxylic acid type functional group or a sulfonic acid type functional group, and tetrafluoroethylene (hereinafter referred to TFE), in a polymerization medium in the presence of a polymerization initiator, in a container capable of polymerizing a monomer in a pressurized state.

As the polymerization initiator, usually an azo compound or an organic peroxide is used (for example, Patent Document 1).

However, with an azo compound, the polymerization rate is slow, and therefore, when an azo compound is used as a polymerization initiator, the productivity of a fluorinated polymer tends to be low. Further, in the case of using an azo compound as a polymerization initiator, the molecular weight of an obtainable fluorinated polymer tends to be low.

On the other hand, with an organic peroxide, the polymerization rate is fast as compared with the azo compound, and therefore, when an organic peroxide is used as a polymerization initiator, the productivity of a fluorinated polymer will be better as compared with the case of using the azo compound. Further, in the case of using the organic peroxide as a polymerization initiator, the molecular weight of an obtainable fluorinated polymer will be relatively high.

However, a usually available organic peroxide has a low molecular weight and is likely to be easily volatilized. Therefore, when a fluorinated monomer having a relatively high boiling point and TFE having a relatively low boiling point are polymerized, the concentration of the organic peroxide and TFE in the gas phase in the container tends to be high. As a result, in the gas phase in the container, TFE tends to be mainly polymerized to form a fluorinated polymer having an extremely high proportion of structural units based on TFE, as an impurity.

As a method for producing a fluorinated polymer, whereby the molecular weight of the obtainable fluorinated polymer is relatively high, and a fluorinated polymer having an extremely high proportion of structural units based on TFE is less likely to be formed as an impurity, the following methods have been proposed.

(1) A method of polymerizing a fluorinated monomer having a sulfonic acid type functional group, and TFE, at from 0 to 35° C. in a polymerization medium in the presence of $[F(CF_2)_{4-10}COO]_2$ or $[CF_3CF_2CF_2O(CF(CF_3)CF_2O)_{0-8}CF(CF_3)COO]_2$ as a polymerization initiator in a container capable of polymerizing a monomer in a pressurized state (Patent Document 2).

(2) A method of polymerizing a fluorinated monomer having a sulfonic acid type functional group, and TFE, at from 25 to 45° C. in a polymerization medium in the presence of $[CF_3CF_2CF_2O(CF(CF_3)CF_2O)_{0-8}CF(CF_3)COO]_2$ as a polymerization initiator in a container capable of polymerizing a monomer in a pressurized state (Patent Document 3).

In the methods (1) and (2), an organic peroxide is used as a polymerization initiator, and the polymerization temperature is relatively low, whereby the molecular weight of an obtainable fluorinated polymer is relatively high. Further, the organic peroxide used in the methods (1) and (2) has a high molecular weight, whereby the concentration in the gas phase in the container is less likely to be high, and a fluorinated polymer having an extremely high proportion of structural units based on TFE is less likely to be formed as an impurity.

However, the organic peroxide used in the methods (1) and (2) is hardly available and is not suitable for industrial production.

PRIOR ART DOCUMENTS

Patent Documents

Patent Document 1: JP-A-6-199959
Patent Document 2: Japanese Patent No. 4946009
Patent Document 3: JP-A-2009-209365

DISCLOSURE OF INVENTION

Technical Problem

The present invention is to provide a method for producing a fluorinated polymer, whereby the productivity of the fluorinated polymer is good, the molecular weight of the obtainable fluorinated polymer is relatively high, and a fluorinated polymer having an extremely high proportion of structural units based on TFE is less likely to be formed as an impurity, and which is suitable for industrial production.

Solution to Problem

The method for producing a fluorinated polymer of the present invention comprises carrying out polymerization in a container capable of polymerizing a monomer in a pressurized state, in the presence of at least one organic peroxide selected from the group consisting of a compound represented by the following formula (A1), a compound represented by the following formula (A2), a compound represented by the following formula (A3) and a compound represented by the following formula (A4), in a polymerization medium containing at least one fluorinated solvent (B) having a boiling point at normal pressure of at most 60° C., using at least a fluorinated monomer (C) having a boiling point at normal pressure higher than said fluorinated solvent (B), and TFE, at a temperature of at most 70° C. and at least the boiling point at normal pressure of a fluorinated solvent (B) having the lowest boiling point at normal pressure among said fluorinated solvent (B):

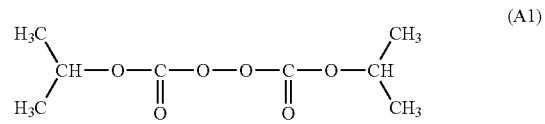

(A1)

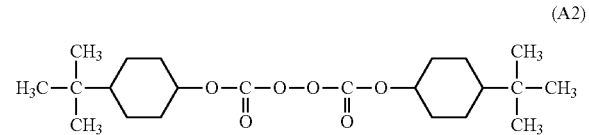

(A2)

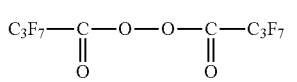
(A3)

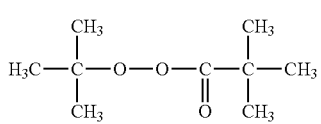
(A4)

The fluorinated polymer preferably contains from 15 to 40 mol % of structural units based on the fluorinated monomer (C), and the mass average molecular weight of the fluorinated polymer is preferably at least 150,000.

The fluorinated monomer (C) is preferably at least one member selected from the group consisting of a compound having a boiling point at normal pressure higher than said fluorinated solvent (B), among compounds represented by the following formula (C1), and a compound having a boiling point at normal pressure higher than said fluorinated solvent (B), among compounds represented by the following formula (C2).

$$F_2C=CF-(CF_2)_p-(O)_q-(CF_2CFX^1)_r-(O)_s-(CF_2)_t-(CF_2CFX^2)_u-A^1 \quad (C1)$$

wherein $X^1$ is a fluorine atom or a trifluoromethyl group, $X^2$ is a fluorine atom or a trifluoromethyl group, $A^1$ is a carboxylic acid type functional group, a sulfonic acid type functional group or a trifluoromethyl group, p is 0 or 1, q is 0 or 1, r is an integer of from 0 to 3, s is 0 or 1, t is an integer of from 0 to 12, u is an integer of from 0 to 3, provided 1≤r+u,

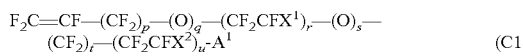
(C2)

wherein $Q^1$ is a perfluoroalkylene group which may have an etheric oxygen atom, $Q^2$ is a single bond, or a perfluoroalkylene group which may have an etheric oxygen atom, Y is a fluorine atom or a monovalent perfluoro organic group, $A^2$ is a carboxylic acid type functional group, a sulfonic acid type functional group or a trifluoromethyl group, and v is 0 or 1.

The boiling point at normal pressure of said fluorinated solvent (B) is preferably at least 10° C.

The ion exchange capacity of the fluorinated polymer is preferably from 0.5 to 2.0 meq/g dry resin.

The fluorinated monomer (C) is preferably at least one member selected from the group consisting of a compound represented by the following formula (C1-1) and a compound represented by the following formula (C2-1):

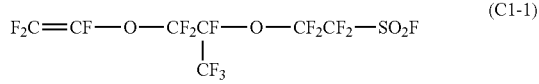
(C1-1)

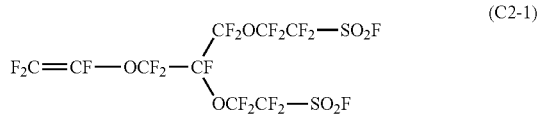
(C2-1)

Said fluorinated solvent (B) is either one or both of a hydrofluorocarbon and a hydrofluoroether.

The hydrofluorocarbon is preferably at least one member selected from the group consisting of $CHF_2CH_2CF_3$, $CF_3CH_2CF_2CH_3$ and $CF_3CFHCFHCF_2CF_3$, and the hydrofluoroether is preferably $CF_3CH_2OCF_2CF_2H$.

Said fluorinated solvent (B) is preferably at least one member selected from the group consisting of $CHF_2CH_2CF_3$, $CF_3CH_2CF_2CH_3$, and $CF_3CH_2OCF_2CF_2H$.

Advantageous Effects of Invention

According to the method for producing a fluorinated polymer of the present invention, the productivity of the fluorinated polymer is good, the molecular weight of the obtainable fluorinated polymer is relatively high, and a fluorinated polymer having an extremely high proportion of structural units based on TFE is less likely to be formed as an impurity, and the method is suitable for industrial production.

DESCRIPTION OF EMBODIMENTS

In this specification, a compound represented by the formula (A1) will be referred to as a compound (A1). Compounds represented by other formulae will be referred to in the same manner.

The following definitions of terms shall apply throughout this specification and claims.

The "container capable of polymerizing a monomer in a pressurized state" is meant for a container which is sealed except for a supply port of a monomer, etc. so that the inside can be made in a pressurized state by supplying TFE.

The "pressurized state" means a state that is under a pressure higher than atmospheric pressure.

The term "normal pressure" means 1 atm (101325 Pa).

The "monomer" means a compound having a polymerizable carbon-carbon double bond.

The term "structural units" means units derived from a monomer, formed by polymerization of the monomer. Structural units may be units which are directly formed by polymerization of a monomer, or may be units having some of such units converted to another structure by treatment of the polymer.

The "carboxylic acid type functional group" means a carboxylic acid group (—COOH) itself or a functional group which can be converted to a carboxylic acid group by hydrolysis or neutralization.

The "sulfonic acid type functional group" means a sulfonic acid group (—SO₃H) itself or a functional group which can be converted to a sulfonic acid group by hydrolysis or neutralization.

<Method of Producing Fluorinated Polymer>

The method for producing a fluorinated polymer of the present invention is a method of polymerizing at least a specific fluorinated monomer (C) and TFE at a specific polymerization temperature in a polymerization medium containing a specific fluorinated solvent (B) in the presence of a specific organic peroxide, in a container capable of polymerizing a monomer in a pressurized state.

(Container)

The container may be a container capable of polymerizing a monomer in a pressurized state, and it is not particularly limited.

As the container, for example, an autoclave, a reaction container, a stirring tank, an ampoule, a pressurized container, etc. may be mentioned.

(Organic Peroxide)

The specific organic peroxide in the present invention is at least one organic peroxide selected from the group consisting of the compound (A1), the compound (A2), the compound (A3) and the compound (A4).

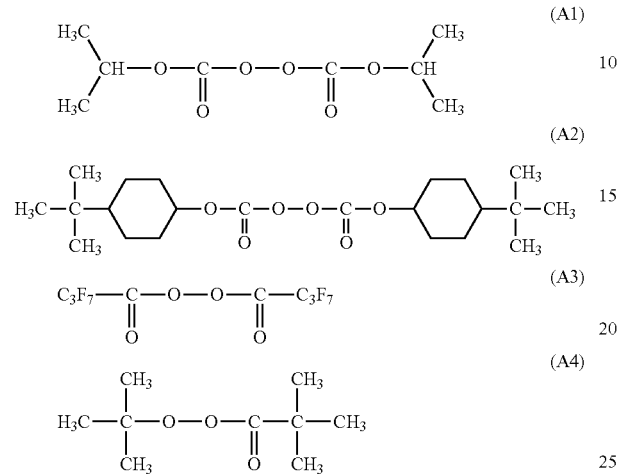

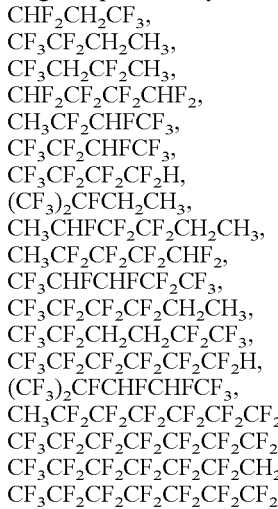

The molecular weight of the compound (A1) is 206, and the 10 hours half-life temperature thereof is 41° C.

The molecular weight of the compound (A2) is 399, and the 10 hours half-life temperature thereof is 41° C.

The molecular weight of the compound (A3) is 426, and the 10 hours half-life temperature thereof is 21° C.

The molecular weight of the compound (A4) is 174, and the 10 hours half-life temperature thereof is 55° C.

The compound (A1) is available as PEROYL (registered trademark) IPP manufactured by NOF CORPORATION.

The compound (A2) is available as PEROYL (registered trademark) TCP manufactured by NOF CORPORATION.

The compound (A3) is available as PFB manufactured by NOF CORPORATION.

The compound (A4) is available as PERBUTYL (registered trademark) PV manufactured by NOF CORPORATION.

(Polymerization Medium)

The polymerization medium contains one or more types of fluorinated solvent (B) having a boiling point at normal pressure of at most 60° C. The polymerization medium may contain, as the case requires, other fluorinated solvent(s) having a boiling point exceeding 60° C. at normal pressure or non-fluorinated solvent(s) having no fluorine atom, within a range not to impair the effects of the present invention.

The polymerization medium also contains a solvent used to dissolve a polymerization initiator at the time of adding the polymerization initiator and a solvent used for washing of the addition line.

(Fluorinated Solvents)

As fluorinated solvents (fluorinated solvent (B) and other fluorinated solvents), a chlorofluorocarbon, a hydrochlorofluorocarbon, a hydrofluorocarbon, a hydrofluoroether, etc. are preferred, and from such a viewpoint that the influence to the ozone layer is less, either one or both of a hydrofluorocarbon and a hydrofluoroether are more preferred.

In the hydrofluorocarbon, the ratio of the number of hydrogen atoms/the number of fluorine atoms on a molar basis (hereinafter referred to as H/F) is preferably from 0.05 to 20, more preferably from 0.06 to 1. If the H/F ratio is less than 0.05, the solubility of the polymerization initiator tends to be insufficient. If the H/F ratio exceeds 20, the chain transfer constant of the polymerization reaction tends to be large, whereby it tends to be difficult to obtain a fluorinated polymer having the desired molecular weight.

The hydrofluorocarbon may be linear or branched.

As specific examples of the hydrofluorocarbon, the following compounds may be mentioned.

$CHF_2CH_2CF_3$,
$CF_3CF_2CH_2CH_3$,
$CF_3CH_2CF_2CH_3$,
$CHF_2CF_2CF_2CHF_2$,
$CH_3CF_2CHFCF_3$,
$CF_3CF_2CHFCF_3$,
$CF_3CF_2CF_2CF_2H$,
$(CF_3)_2CFCH_2CH_3$,
$CH_3CHFCF_2CF_2CH_2CH_3$,
$CH_3CF_2CF_2CF_2CHF_2$,
$CF_3CHFCHFCF_2CF_3$,
$CF_3CF_2CF_2CF_2CH_2CH_3$,
$CF_3CF_2CH_2CH_2CF_2CF_3$,
$CF_3CF_2CF_2CF_2CF_2CF_2H$,
$(CF_3)_2CFCHFCHFCF_3$,
$CH_3CF_2CF_2CF_2CF_2CF_2H$,
$CF_3CF_2CF_2CF_2CF_2CF_2CF_2H$,
$CF_3CF_2CF_2CF_2CF_2CF_2CH_2CH_3$,
$CF_3CF_2CF_2CF_2CF_2CF_2CF_2CHF_2$.

As the hydrofluoroether, $R^4$—O—$R^5$ (wherein each of $R^4$ and $R^5$ is a polyfluoroalkyl group, at least one of $R^4$ and $R^5$ has hydrogen atom(s), and in $R^4$ and $R^5$, the total number of carbon atoms is form 3 to 8) may be mentioned.

The polyfluoroalkyl group is preferably a linear or branched hydrofluoroalkyl group or perfluoroalkyl group. When either one of $R^4$ and $R^5$ is a perfluoroalkyl group, the other is a hydrofluoroalkyl group. If both of $R^4$ and $R^5$ are perfluoroalkyl groups, the global warming potential becomes high. Further, $R^4$ and $R^5$ may be the same or different polyfluoroalkyl groups. The total number of fluorine atoms in $R^4$ and $R^5$ is preferably larger than the total number of hydrogen atoms therein. If the number of hydrogen atoms is large, the chain transfer constant becomes large, and therefore, the number of hydrogen atoms should better be small so that the chain transfer constant becomes small. The total number of fluorine atoms in $R^4$ and $R^5$ is preferably at least 60%, more preferably at least 65%, relative to the total number of hydrogen atoms and fluorine atoms. The total number of carbon atoms in $R^4$ and $R^5$ is from 3 to 8, preferably from 4 to 6. If the number of carbon atoms in $R^4$ and $R^5$ is too small, the boiling point becomes low, and the handling efficiency as a polymerization medium becomes insufficient. If the number of carbon atoms in $R^4$ and $R^5$ is too large, the boiling point becomes high, and it becomes difficult to separate the fluorinated copolymer and the polymerization medium.

The hydrofluoroether is preferably at least one member selected from the group consisting of $CF_3CH_2OCF_2CF_2H$, $CHF_2CF_2CH_2OCF_2CF_2H$ and $CF_3CF_2CH_2OCF_2CF_2H$, more preferably $CF_3CH_2OCF_2CF_2H$.

(Fluorinated Solvent (B))

Among the above-described fluorinated solvents, a fluorinated solvent (B) is one having a boiling point at normal pressure of at most 60° C.

The boiling point of such a fluorinated solvent (B) is preferably at most 60° C., more preferably at most 56° C., from such a viewpoint that a fluorinated polymer having an extremely high proportion of structural units based on TFE is thereby less likely to be formed as an impurity. The boiling point of the fluorinated solvent (B) is preferably at least 5° C., more preferably at least 10° C., from the viewpoint of handling efficiency.

As the fluorinated solvent (B), either one or both of a hydrofluorocarbon having a boiling point at normal pressure of at most 60° C. and a hydrofluoroether having a boiling point at normal pressure of at most 60° C. are preferred, since the vapor pressure at the reaction temperature is thereby high so that the TFE concentration in the gas phase in the container is less likely to become high, and a fluorinated polymer having an extremely high proportion of structural units based on TFE is less likely to be formed as an impurity.

As the hydrofluorocarbon having a boiling point at normal pressure of at most 60° C., at least one member selected from the group consisting of $CHF_2CH_2CF_3$, $CF_3CH_2CF_2CH_3$ and $CF_3CFHCFHCF_2CF_3$. is preferred, whereby the ozone depletion potential is zero, and a polymer having a high molecular weight is readily obtainable.

As the hydrofluoroether having a boiling point at normal pressure of at most 60° C., $CF_3CH_2OCF_2CF_2H$ is preferred, whereby the ozone depletion potential is zero, and a polymer having a high molecular weight is readily obtainable.

(Monomers)

As monomers, at least TFE and a fluorinated monomer (C) having a boiling point at normal pressure higher than the fluorinated solvent (B) actually used at the time of producing a fluorinated polymer, are used. As monomers, other fluorinated monomers (excluding TFE) with boiling points at normal pressure being the same as or lower than the boiling point of the fluorinated solvent (B) actually used at the time of producing a fluorinated polymer, and/or non-fluorinated monomers having no fluorine atoms, may further be used, as the case requires, within a range not to impair the effects of the present invention.

(Fluorinated Monomers)

Fluorinated monomers (fluorinated monomer (C), TFE and other fluorinated monomers) are not particularly limited so long as they are fluorinated monomers having one or more fluorine atoms in their molecules and having a polymerization reactive carbon-carbon double bond, and conventional ones may be used.

The fluorinated monomers may, for example, be a fluorinated monomer having a carboxylic acid type functional group or sulfonic acid type functional group, a fluorinated olefin, $CF_2=CF-R^f$ (wherein $R^f$ is a $C_{1-10}$ perfluoroalkyl group containing an etheric oxygen atom in the middle), $CF_2=CF-OR^{f1}$ (wherein $R^{f1}$ is a $C_{1-10}$ perfluoroalkyl group which may contain an etheric oxygen atom in the middle), $CF_2=CFO(CF_2)_wCF=CF_2$ (wherein w is an integer of from 1 to 3), etc.

The fluorinated olefin may, for example, be TFE, chlorotrifluoroethylene, vinylidene fluoride, vinyl fluoride, hexafluoropropylene, etc. As the fluorinated olefin, one type may be used alone, or two or more types may be used in combination.

The fluorinated monomer having a carboxylic acid type functional group or sulfonic acid type functional group, is not particularly limited, so long as it is a compound having one or more fluorine atoms in its molecule and having a polymerization reactive carbon-carbon double bond, and a carboxylic acid type functional group or sulfonic acid type functional group, and it is possible to use conventional one.

(Fluorinated Monomer (C))

Among the above-described fluorinated monomers, a fluorinated monomer (C) is one having a boiling point at normal pressure higher than the fluorinated solvent (B) actually used at the time of producing a fluoropolymer. When two or more fluorinated solvents (B) are used, the fluorinated monomer (C) is one having a boiling point at normal pressure higher than the fluorinated solvent (B) having the highest boiling point at normal pressure.

As the fluorinated monomer (C), a compound (C1) is preferred from the viewpoint of the production cost of the monomer, reactivity with other monomers and excellent properties of an obtainable fluoropolymer.

As the fluorinated monomer (C), a compound (C2) is preferred from the viewpoint of more excellent properties of an obtainable fluoropolymer.

The compound (C1) and the compound (C2) may be used in combination.

(Compound (C1))

A compound (C1) is a compound having a boiling point at normal pressure higher than the fluorinated solvent (B), among compounds represented by the following formula (C1).

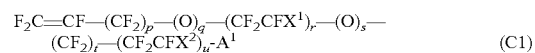

$F_2C=CF-(CF_2)_p-(O)_q-(CF_2CFX^1)_r-(O)_s-$
$(CF_2)_t-(CF_2CFX^2)_u-A^1$ (C1)

$X^1$ is a fluorine atom or a trifluoromethyl group. Further, $X^2$ is a fluorine atom or a trifluoromethyl group. In a case where both $X^1$ and $X^2$ are present in one molecule, they may be the same or different.

$A^1$ is a carboxylic acid type functional group, a sulfonic acid type functional group or a trifluoromethyl group.

The carboxylic acid type functional group is a carboxylic acid group (—COOH) itself or a functional group convertible to a carboxylic acid group by hydrolysis or neutralization. The functional group convertible to a carboxylic acid group may, for example, be —CN, —COF, —COOR$^1$ (wherein R$^1$ is a $C_{1-10}$ alkyl group), —COOM (wherein M is an alkali metal or a quaternary ammonium salt), —COOHR$^2$R$^3$ (wherein R$^2$ and R$^3$ are each a hydrogen atom or a $C_{1-10}$ alkyl group, and R$^2$ and R$^3$ may be the same or different), etc.

The sulfonic acid type functional group is a sulfonic acid group (—SO$_3$H) itself or a functional group convertible to a sulfonic acid group by hydrolysis or neutralization. The functional group convertible to a sulfonic acid group may, for example, be —SO$_3$M (wherein M is an alkali metal or a quaternary ammonium salt), —SO$_2$F, —SO$_2$Cl, —SO$_2$Br, etc.

p is 0 or 1, q is 0 or 1, r is an integer of from 0 to 3, s is 0 or 1, t is an integer of from 0 to 12, and u is an integer of from 0 to 3. However, there is no possibility that r and u become 0 at the same time. That is, 1≤r+u.

As specific examples of the compound (C1) having a carboxylic acid type functional group, the following compounds may be mentioned, and from the viewpoint of easy production, a compound wherein p=0, q=1, r=1, s=0 to 1, t=1 to 3, and u=0 to 1, is preferred, and $CF_2=CF-O-CF_2CF_2-CF_2-COOCH_3$ or $CF_2=CF-O-CF_2CF(CF_3)-O-CF_2CF_2-COOCH_3$ is particularly preferred.

$CF_2=CF-O-CF_2CF_2-COOCH_3$,
$CF_2=CF-O-CF_2CF_2-CF_2-COOCH_3$,
$CF_2=CF-O-CF_2CF_2-CF_2CF_2-COOCH_3$,
$CF_2=CF-O-CF_2CF_2-O-CF_2CF_2-COOCH_3$,
$CF_2=CF-O-CF_2CF_2-O-CF_2CF_2-CF_2-COOCH_3$,
$CF_2=CF-O-CF_2CF_2-O-CF_2CF_2-CF_2CF_2-COOCH_3$,
$CF_2=CF-O-CF_2-CF_2CF_2-O-CF_2CF_2-COOCH_3$,
$CF_2=CF-O-CF_2CF(CF_3)-O-CF_2CF_2-COOCH_3$,

CF$_2$=CF—O—CF$_2$CF(CF$_3$)—O—CF$_2$—CF$_2$CF$_2$—COOCH$_3$.

As the compound (C1) having a sulfonic acid type functional group, a compound (C11) or a compound (C12) is preferred from the viewpoint of the production cost of the monomer, reactivity with other monomers and excellent properties of an obtainable fluoropolymer.

$$CF_2=CF—O—R^{f2}-A^{11} \quad (C11),$$

$$CF_2=CF—R^{f2}-A^{11} \quad (C12).$$

$R^{f2}$ is a $C_{1-20}$ perfluoroalkylene group which may contain an etheric oxygen atom and may be either linear or branched.

$A^{11}$ is a sulfonic acid type functional group.

As the compound (C11), specifically the following compounds are preferred.
CF$_2$=CF—O—(CF$_2$)$_{1-8}$—SO$_2$F,
CF$_2$=CF—O—CF$_2$CF(CF$_3$)—O—(CF$_2$)$_{1-8}$—SO$_2$F,
CF$_2$=CF—[OCF$_2$CF(CF$_3$)]$_{1-5}$—SO$_2$F.

As the compound (C12), specifically the following compounds are preferred.
CF$_2$=CF—(CF$_2$)$_{0-8}$—SO$_2$F,
CF$_2$=CF—CF$_2$—O—(CF$_2$)$_{1-8}$—SO$_2$F.

As the compound (C1) having a sulfonic acid type functional group, from the viewpoint of easy industrial synthesis, the following compounds are more preferred.
CF$_2$=CF—O—CF$_2$CF$_2$—SO$_2$F,
CF$_2$=CF—O—CF$_2$CF$_2$CF$_2$—SO$_2$F,
CF$_2$=CF—O—CF$_2$CF$_2$CF$_2$CF$_2$—SO$_2$F,
CF$_2$=CF—O—CF$_2$CF(CF$_3$)—O—CF$_2$CF$_2$—SO$_2$F,
CF$_2$=CF—O—CF$_2$CF(CF$_3$)—O—CF$_2$CF$_2$CF$_2$—SO$_2$F,
CF$_2$=CF—O—CF$_2$CF(CF$_3$)—SO$_2$F,
CF$_2$=CF—CF$_2$CF$_2$—SO$_2$F,
CF$_2$=CF—CF$_2$CF$_2$CF$_2$—SO$_2$F,
CF$_2$=CF—CF$_2$CF$_2$CF$_2$CF$_2$—SO$_2$F,
CF$_2$=CF—CF$_2$—O—CF$_2$CF$_2$—SO$_2$F.

As the compound (C1) wherein A1 is a trifluoromethyl group, from the viewpoint of easy production of the compound and easy industrial implementation, compounds (C13) to (C15) are preferred.

$$CF_2=CF—O(CF_2)_iCF_3 \quad (C_{13}),$$

$$CF_2=CF—(OCF_2CF(CF_3))_jO(CF_2)_xCF_3 \quad (C_{14}),$$

$$CF_2=CF—(OCF_2CF_2)_yO(CF_2)_zCF_3 \quad (C_{15}).$$

Here, i is an integer of from 0 to 3, j is 1 or 2, x is an integer of from 0 to 2, y is 1 or 2, and z is an integer of from 0 to 2.

As specific examples of the compound (C1) wherein A1 is a trifluoromethyl group, the following compounds may be mentioned.
CF$_2$=CF—OCF$_2$CF(CF$_3$)OCF$_2$CF$_2$CF$_3$,
CF$_2$=CF—OCF$_3$,
CF$_2$=CF—OCF$_2$CF$_2$OCF$_2$CF$_2$OCF$_2$CF$_3$,
CF$_2$=CF—OCF$_2$CF$_2$CF$_3$,
CF$_2$=CF—OCF$_2$CF$_2$OCF$_2$CF$_2$OCF$_2$OCF$_3$,
CF$_2$=—CF—OCF$_2$OCF$_2$CF$_2$CF$_3$,
CF$_2$=CF—OCF$_2$OCF$_2$OCF$_2$OCF$_3$,
CF$_2$=CF—OCF$_2$OCF$_3$,
CF$_2$=CF—OCF$_2$(CF$_2$)$_3$OCF$_3$,
CF$_2$=CF—O[CF$_2$CF$_2$CF$_2$O]$_n$CF$_2$CF$_2$CF$_3$ (wherein n is an integer of from 0 to 4.)
CF$_2$=CF—OCF$_2$CF$_2$OCF$_2$OCF$_2$OCF$_3$,
CF$_2$=CF—OCF$_2$OCF$_2$CF$_2$OCF$_3$,
CF$_2$=CF—OCF$_2$OCF$_2$CF$_3$,
CF$_2$=CF—OCF$_2$CF$_2$OCF$_2$OCF$_2$OCF$_3$,
CF$_2$=CF—OCF$_2$CF$_2$CF$_2$O(CF$_2$)$_3$O(CF$_2$)$_3$OCF$_2$CF$_2$CF$_3$,
CF$_2$=CF—OCF$_2$CF$_2$OCF$_2$OCF$_2$CF$_2$OCF$_2$CF$_2$OCF$_3$,
CF$_2$=CF—OCF$_2$CF$_2$OCF$_2$CF$_2$OCF$_2$CF$_2$OCF$_3$,
CF$_2$=CF—OCF$_2$CF$_2$CF$_2$O(CF$_2$)$_3$OCF$_2$CF$_2$CF$_3$,
CF$_2$=CF—OCF$_2$CF$_2$OCF$_2$OCF$_2$OCF$_3$,
CF$_2$=CF—OCF$_2$CF$_2$OCF$_2$OCF$_2$OCF$_2$OCF$_3$,
CF$_2$=CF—OCF$_2$CF$_2$CF$_2$OCF$_3$,
CF$_2$=CF—OCF$_2$CF$_2$OCF$_2$OCF$_3$,
CF$_2$=CF—OCF$_2$CF$_2$OCF$_3$,
CF$_2$=CF—OCF$_2$CF$_2$OCF$_2$CF$_3$,
CF$_2$=CF—OCF$_2$CF$_2$CF$_2$OCF$_2$CF$_2$CF$_3$.

(Compound (C2))

A compound (C2) is a compound having a boiling point at normal pressure higher than the fluorinated solvent (B) among compounds represented by the following formula (C2).

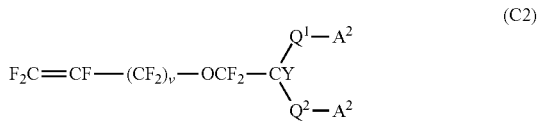

Here, $Q^1$ is a perfluoroalkylene group which may have an etheric oxygen atom, $Q^2$ is a single bond or a perfluoroalkylene group which may have an ether oxygen atom, Y is a fluorine atom or a monovalent perfluoro organic group, $A^2$ is a carboxylic acid type functional group, a sulfonic acid type functional group or a trifluoromethyl group, and v is 0 or 1.

When the perfluoroalkylene group for $Q^1$ or $Q^2$ has an etheric oxygen atom, the number of such oxygen atoms may be one or more. Further, such an oxygen atom may be inserted between carbon-carbon atoms in the perfluoroalkylene group, or it may be inserted at the terminal of the carbon atom bond.

The perfluoroalkylene group may be linear or branched, and it is preferably linear.

The number of carbon atoms in the perfluoroalkylene group is preferably from 1 to 6, more preferably from 1 to 4. If the number of carbon atoms is too large, the boiling point of the fluorinated monomer tends to be high, and purification by distillation tends to be difficult. Further, if the number of carbon atoms is too large, the ion exchange capacity of the fluorinated polymer tends to be low.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, as compared with the case where $Q^2$ is a single bond, the stability of the output voltage will be excellent when the polymer electrolyte fuel cell is driven over a long period of time.

At least one of $Q^1$ and $Q^2$ is preferably a $C_{1-6}$ perfluoroalkylene group having an etheric oxygen atom. A fluorinated monomer having a $C_{1-6}$ perfluoroalkylene group having an etheric oxygen atom, can be synthesized without a fluorination reaction with a fluorine gas, whereby the yield is good, and the production is easy.

$A^2$ is a carboxylic acid type functional group, a sulfonic acid type functional group or a trifluoromethyl group.

The carboxylic acid type functional group is a carboxylic acid group (—COOH) itself or a functional group convertible to a carboxylic acid group by hydrolysis or neutralization. The functional group convertible to a carboxylic acid group may be those described above.

The sulfonic acid type functional group is a sulfonic acid group (—SO₃H) itself or a functional group convertible to a sulfonic acid group by hydrolysis or neutralization. The functional group convertible to a sulfonic acid group may be those described above.

Y is preferably a fluorine atom, or a $C_{1-6}$ linear perfluoroalkyl group which may have an etheric oxygen atom.

As the compound (C2) having a sulfonic acid type functional group, from the viewpoint of easy industrial synthesis, the following compounds are more preferred.

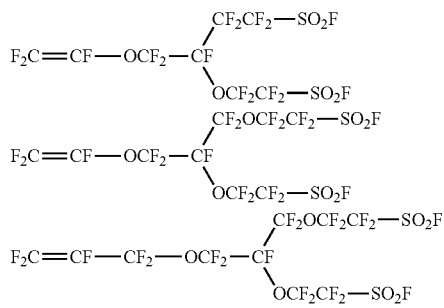

(Charging of Monomers)

The proportions of the respective monomers (fluorinated monomer (C), TFE, etc.) are adjusted so that the respective structural units in an obtainable fluorinated polymer will be in desired proportions.

The respective monomers may be charged all at once, or may be charged continuously or intermittently. With a view to bringing the concentrations of monomers in the reaction system to be constant, so as to uniformize the composition of an obtainable fluorinated polymer, it is preferred to supply the respective monomers continuously or intermittently to let them react continuously or intermittently.

TFE is a gas, and therefore, it is usually supplied separately from the fluorinated monomer (C).

The fluorinated monomer (C) and TFE may be all continuously supplied or may be partly continuously supplied so that the rest be intermittently supplied, or they may be all intermittently supplied. Some or all of the monomers except for TFE, may be preliminarily charged to the container.

(Addition of Polymerization Initiator)

Monomers, a polymerization initiator, etc. are added to a polymerization medium, to let radicals be formed in the polymerization medium, thereby to carry out polymerization of the monomers. The addition of the polymerization initiator may be all at once, may be sequential, or may be continuous.

The polymerization initiator is preferably added in a state of being preliminarily dissolved in a solvent. As the solvent, the fluorinated solvent (B) is preferred.

The amount of the polymerization initiator to be added per 100 parts by mass of all monomers, is preferably from 0.0001 to 3 parts by mass, more preferably from 0.0001 to 2 parts by mass. By reducing the amount of the polymerization initiator to be added, it is possible to increase the molecular weight of the fluorinated polymer. In addition to the polymerization initiator, a molecular weight modifier or the like which is commonly used in a usual solution polymerization may be added.

(Polymerization Temperature)

The polymerization temperature is at most 70° C. and at least the boiling point at normal pressure of a fluorinated solvent (B) having the lowest boiling point at normal pressure among fluorinated solvents (B).

When the polymerization temperature is higher than the boiling point at normal pressure of the fluorinated solvent (B) in a case where one type of fluorinated solvent (B) is used alone, or is higher than the boiling point at normal pressure of any one of fluorinated solvents (B) in a case where two or more fluorinated solvents (B) are used, the concentration of the fluorinated solvent (B) in the gas phase in the container becomes high, and relatively, the concentrations of TFE and the organic peroxide in the gas phase in the container become low, whereby a fluorinated polymer containing an extremely high proportion of structural units based on TFE is less likely to be formed as an impurity in the gas phase.

When the polymerization temperature is at most 70° C., the molecular weight of an obtainable fluorinated polymer tends to be relatively high. The polymerization temperature is preferably at most 65° C., more preferably at most 60° C.

(Polymerization Pressure)

The polymerization pressure (gauge pressure) is preferably from 0.1 to 5.0 MPaG, more preferably from 0.5 to 3.0 MPaG. When the polymerization pressure (gauge pressure) is within the above range, it is possible to maintain the speed of the polymerization reaction to be at a practically satisfactory level, and it is possible to obtain a fluorinated polymer having a high molecular weight.

(Fluorinated Polymer)

The fluorinated polymer obtained by the production method of the present invention has structural units based on the fluorinated monomer (C) and structural units based on TFE.

The proportion of structural units based on the fluorinated monomer (C), is preferably from 15 to 40 mol %, more preferably from 16 to 35 mol %, per 100 mol % of all constituent units constituting the fluorinated polymer. When the proportion of structural units based on the fluorinated monomer (C) is at least 15 mol %, it is easy to soften the product, and it is easy to let the characteristics of structural units based on the fluorinated monomer (C) be expressed. Further, in a case where the structural units based on the fluorinated monomer (C) have ion exchange groups (acid- or salt-form carboxylic acid groups, sulfonic acid groups, etc.), they show a sufficient ion exchange performance. When the proportion of structural units based on the fluorinated monomer (C) is at most 40 mol %, it becomes easy to secure a sufficient molecular weight, and handling in a solid, powder or film form becomes easier.

The mass average molecular weight of the fluorinated monomer (C) is preferably at least 150,000, more preferably from 150,000 to 800,000, further preferably from 150,000 to 600,000. When the mass average molecular weight of the fluorinated monomer (C) is at least 150,000, the mechanical strength will be high and the durability will be high. When the mass average molecular weight of the fluorinated monomer (C) is at most 600,000, the moldability and liquid dispersibility will be excellent.

The ion exchange capacity of a fluorinated polymer having carboxylic acid type functional groups or sulfonic acid type functional groups, is preferably from 0.5 to 2.0 meq/g dry resin, when it is to be used as an ion exchange membrane. Even when the ion exchange capacity of the fluorinated polymer is increased, it is possible to increase the molecular weight of the fluorinated polymer, whereby the mechanical properties and durability of the fluorinated polymer will not be lowered. The ion exchange capacity of the fluorinated polymer is preferably at least 0.6 meq/g dry resin, more preferably at least 0.7 meq/g dry resin, from the viewpoint of the mechanical properties and electrochemical performance as an ion exchange membrane.

The molecular weight of the fluorinated polymer having carboxylic acid type functional groups or sulfonic acid type functional groups is related to the mechanical performance and film formability as an ion exchange membrane. The molecular weight of the fluorinated polymer is preferably at least 150° C., more preferably from 170 to 340° C., further preferably from 170 to 300° C., as TQ value.

TQ value is a value related to the molecular weight of a polymer, and is one represented by a temperature showing a volume flow rate of 100 mm³/sec. The volume flow rate is one obtained in such a manner that a polymer is melted and permitted to flow out from an orifice (diameter: 1 mm, length: 1 mm) at a constant temperature under a pressure of 3 MPa, whereby the amount of the polymer flowing out, is shown by the unit of mm³/sec. The TQ value becomes an index for the molecular weight of the polymer, such that the higher the TQ value, the higher the molecular weight.

(Ion Exchange Membrane)

By film-forming the fluorinated polymer having a carboxylic acid type functional groups or sulfonic acid type functional groups, it is possible to obtain an ion exchange membrane. The method of producing an ion exchange membrane comprises a step of film-forming the fluorinated polymer, and a step of converting carboxylic acid type functional groups or sulfonic acid type functional groups of the fluorinated polymer to the acid form by hydrolysis. Either the film-forming step or the conversion step may be performed first, but it is preferred to carry out the film forming step first.

An ion exchange membrane may be a laminate which has a plurality of layers each containing the fluorinated polymer obtained by the production method of the present invention, wherein the ion-exchange capacities of the fluorinated polymers in the respective layers may be different; a laminate which has a layer containing a fluorinated polymer having carboxylic acid type functional groups and a layer containing a fluorinated polymer having sulfonic acid type functional groups, obtained by the production method of the present invention; or a laminate having a reinforcing material.

As the reinforcing material, a woven fabric (cloth), fibers, non-woven fabric, etc. may be mentioned.

The ion exchange membrane may be used for e.g. electrolysis of an alkali chloride, diffusion dialysis, ozone generation electrolysis, electrolytic reduction, fuel cells, polymer catalysts, etc. and is suitable as an ion exchange membrane for electrolysis of an alkali chloride such as sodium chloride, or as an electrolyte membrane for a fuel cell.

Advantageous Effects

In the method for producing a fluorinated polymer of the present invention as described above, in a container capable of polymerizing a monomer in a pressurized state, in the presence of at least one organic peroxide selected from the group consisting of the compound (A1), the compound (A2), the compound (A3) and the compound (A4), in a polymerization medium containing at least one fluorinated solvent (B) having a boiling point at normal pressure of at most 60° C., at least TFE and a fluorinated monomer (C) having a boiling point at normal pressure higher than the fluorinated solvent (B), are polymerized at a temperature of at most 70° C. and at least the boiling point at normal pressure of a fluorinated solvent (B) having the lowest boiling point at normal pressure among the fluorinated solvent (B), whereby the productivity of the fluorinated polymer is good, the molecular weight of the obtainable fluorinated polymer is relatively high, and a fluorinated polymer having an extremely large proportion of structural units based on TFE, is less likely to be formed as an impurity, and thus, the method is suitable for industrial production.

That is, with an organic peroxide, the polymerization rate is faster as compared with an azo compound, and therefore, in the case of using the organic peroxide as an polymerization initiator, the productivity of a fluorinated polymer becomes better as compared with the case of using the azo compound.

Further, the molecular weight of an obtainable fluorinated polymer is relatively high, since the organic peroxide is used as a polymerization initiator and since the polymerization temperature is at most 70° C.

Further, the compound (A1), the compound (A2), the compound (A3) and the compound (A4) are readily available as compared with the organic peroxides disclosed in Patent Documents 2 and 3 and thus are suitable for industrial production.

Further, the compound (A1), the compound (A2), the compound (A3) and the compound (A4) have low molecular weights and are readily volatilized. Therefore, when the fluorinated monomer (C) having a relatively high molecular weight and TFE having a relatively low boiling point are polymerized, the concentrations of the organic peroxide and TEE in the gas phase in the container tend to be high. As a result, in the gas phase in the container, TFE is mainly polymerized, whereby a fluorinated polymer having an extremely large proportion of structural units based on TFE is likely to be formed as an impurity.

Therefore, in the present invention, the polymerization temperature is set to be at least the boiling point at normal pressure of a fluorinated solvent (B) having the lowest boiling point at normal pressure among the fluorinated solvent (B). When the polymerization temperature is at least the boiling point at normal pressure of the fluorinated solvent (B), the concentration of the fluorinated solvent (B) in the gas phase in the container becomes high and, relatively, the concentrations of TFE and the organic peroxide in the gas phase in the container become low, whereby a fluorinated polymer having an extremely large proportion of structural units based on TFE, becomes less likely to be formed as an impurity.

EXAMPLES

In the following, the present invention will be described in detail with reference to Examples, but the invention is by no means limited by these Examples.

Ex. 1 to 5, 12 and 13 are Examples of the present invention, and Ex. 6 to 11 are Comparative Examples.

(Deposition State)

The polymerization was stopped, and after withdrawing the contents from the container, the presence or absence of deposition of an impurity (a fluorinated polymer having an extremely large proportion of structural units based on TFE) formed in the gas phase, was confirmed by inspecting the ceiling, wall surfaces and stirring shaft which were in contact with the gas phase in the container, and the deposition state was evaluated by the following standards.

◯: No deposit is observed on the ceiling, wall surfaces and stirring shaft.

Δ: Slight deposits are observed on one of the ceiling, wall surfaces and stirring shaft.

x: White deposits are observed on all of the ceiling, wall surfaces and stirring shaft.

(Structural Units)

The proportion of structural units based on a fluorinated monomer (C) in the fluorinated polymer, was obtained from the composition analysis by $^{19}$F-NMR.

(Ion Exchange Capacity)

To a container made of a polycarbonate, 0.7 g of a fluorinated polymer and 10 mL of a 0.35 N sodium hydroxide aqueous solution were added and left to stand at 60° C. for 40 hours, to completely convert carboxylic acid type functional groups or sulfonic acid type functional groups in the fluorinated polymer to Na type. The solution was back-titrated with 0.1 N hydrochloric acid, to obtain the amount of sodium hydroxide in the solution, whereupon the ion-exchange capacity of the fluorinated polymer was calculated.

(TQ)

TQ (unit: ° C.) is an index for the molecular weight and softening temperature of a fluorinated polymer, and is a temperature at which, when the fluorinated polymer is subjected to melt-extrusion under a condition of an extrusion pressure of 2.94 MPa by using a nozzle having a length of 1 mm and an inner diameter of 1 mm, the extrusion amount will be 100 mm$^3$/sec.

Using a flow tester CFT-500D (manufactured by Shimadzu Corporation), extrusion amounts of a fluorinated polymer were measured by changing the temperature, whereby TQ at which the extrusion amount became 100 mm$^3$/sec, was obtained.

(Mass Average Molecular Weight)

A GPC measuring apparatus (manufactured by Tosoh Corporation, HLC-8320GPC) was used to obtain the mass average molecular weight calculated as polymethyl methacrylate. As the solvent, ASAHIKLIN AK-225 SEC Grade-1 (manufactured by Asahi Glass Company, Limited) was used.

(Polymerization Rate)

The polymerization rate Rp was calculated by polymer yield (g)÷reaction time (h)÷initial charge volume (L).

(Productivity)

The productivity was evaluated from the polymerization rate Rp under the following standards.

◯: Rp exceeds 10 g/L·h.

x: Rp is 10 g/L·h or less.

(Organic Peroxides)

Compound (A1): manufactured by NOF CORPORATION, PEROYL (registered trademark) IPP, molecular weight: 206, 10 hour half-life temperature: 41° C.

Compound (A2): manufactured by NOF CORPORATION, PEROYL (registered trademark) TCP, molecular weight: 399, 10 hour half-life temperature: 41° C.

Compound (A3): NOF CORPORATION, PFB, molecular weight: 426, 10 hour half-life temperature: 21° C.

Compound (A4): NOF CORPORATION, PERBUTYL (registered trademark) PV, molecular weight: 174, 10 hour half-life temperature: 55° C.

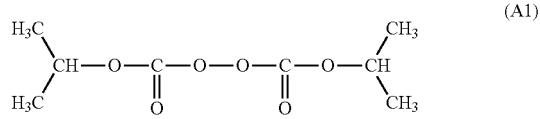

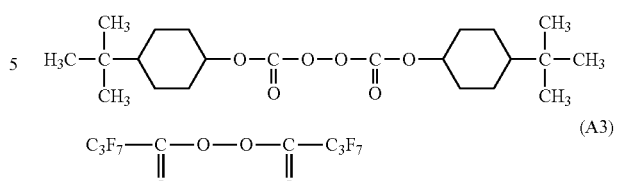

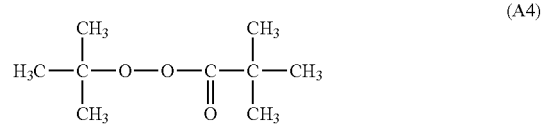

Compound (A'5): manufactured by NOF CORPORATION, PEROYL (registered trademark) L, the molecular weight: 399, 10 hour half-life temperature: 62° C.

Compound (A'6): manufactured by Wako Pure Chemical Industries, Ltd., V-601, molecular weight: 230, 10 hour half-life temperature: 66° C.

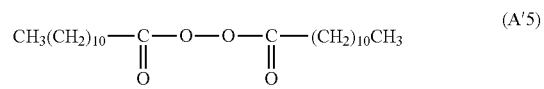

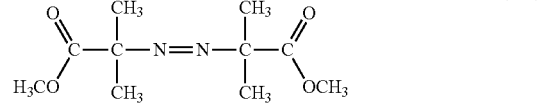

(Fluorinated Solvents)

Compound (B1): CHF$_2$CH$_2$CF$_3$, boiling point at normal pressure: 15° C.

Compound (B2): CClF$_2$CF$_2$CHClF, boiling point at normal pressure: 56° C.

Compound (B3): CH$_3$CCl$_2$F, boiling point at normal pressure: 32° C.

Compound (B'4): C$_6$F$_{13}$H, boiling point at normal pressure: 71° C.

Compound (B5): CF$_3$CH$_2$CF$_2$CH$_3$, boiling point at normal pressure: 40° C.

Compound (B6): CF$_3$CH$_2$OCF$_2$CF$_2$H, boiling point at normal pressure: 56° C.

(Fluorinated Monomers)

TFE, compound (C1-1), compound (C1-2), and compound (C2-1).

The boiling point at normal pressure is 135° C. in the case of compound (C1-1), 103° C. in the case of compound (C1-2), or 215° C. in the case of compound (C2-1).

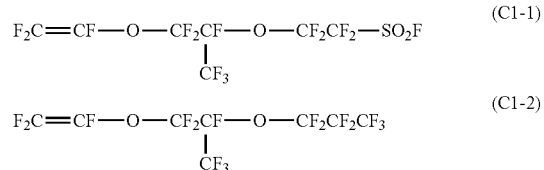

-continued

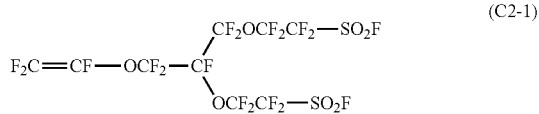
(C2-1)

(Ex. 1)

In a stainless steel autoclave having an inner volume of 2,575 mL, 1,959 g of compound (C1-1) was charged under reduced pressure while cooling with ice-water, followed by deaeration. As a solvent, 36.18 g of compound (B1) was charged. After the temperature was raised to 40° C., nitrogen was introduced to 0.102 MPa. After confirming that the pressure did not change, TFE was introduced to bring the total pressure to be 0.582 MPaG. 1.4 g of a 49.9 mass % solution of compound (A1) dissolved in compound (B2), was added under pressure with nitrogen, and then, the addition line was washed with 3 g of compound (B2). While maintaining the temperature and pressure to be constant, TFE was continuously supplied. After 14 hours from the initiation of polymerization, the autoclave was cooled to terminate the polymerization reaction.

After withdrawing the content from the autoclave, the ceiling, wall surfaces and stirring shaft which were in contact with the gas phase in the container, were observed. The results are shown in Table 1.

The product withdrawn from the autoclave was diluted with compound (B2), and compound (B3) was added thereto, to agglomerate the polymer, followed by filtration. The polymer was stirred in compound (B2), then, re-agglomerated with compound (B3), and dried at 50° C. under reduced pressure overnight. The yield of the obtained fluorinated polymer, the proportion of structural units based on the fluorinated monomer (C), the ion exchange capacity, TQ, the mass average molecular weight, the polymerization rate Rp and the productivity are shown in Table 1.

(Ex. 2)

In a stainless steel autoclave having an inner volume of 2,575 mL, 1,959 g of compound (C1-1) was charged under reduced pressure while cooling with ice-water, followed by deaeration. As a solvent, 36.16 g of compound (B1) was charged. After the temperature was raised to 40° C., nitrogen was introduced to 0.104 MPa. After confirming that the pressure did not change, TFE was introduced to bring the total pressure to be 0.594 MPaG. 3.52 g of a 12.1 mass % solution of compound (A2) dissolved in compound (B2), was added under pressure with nitrogen, and then, the addition line was washed with 3 g of compound (B2). While maintaining the temperature and pressure to be constant, TFE was continuously supplied. Every 4 hours, 3.52 g of a 12.1 mass % solution of compound (A2) was added under pressure with nitrogen, followed by washing the addition line with 3 g of compound (B2). Such an operation was performed twice. After 13 hours from the initiation of polymerization, the autoclave was cooled to terminate the polymerization reaction.

After withdrawing the content from the autoclave, the ceiling, wall surfaces and stirring shaft which were in contact with the gas phase in the container were observed. The results are shown in Table 1.

The product withdrawn from the autoclave was diluted with compound (B2), and compound (B3) was added thereto, to agglomerate the polymer, followed by filtration. The polymer was stirred in compound (B2), then re-agglomerated with compound (B3), and dried at 50° C. under reduced pressure overnight. The yield of the obtained fluorinated polymer, the proportion of structural units based on the fluorinated monomer (C), the ion exchange capacity, TQ, the mass average molecular weight, the polymerization rate Rp and the productivity are shown in Table 1.

(Ex. 3)

A fluorinated polymer was obtained in the same manner as in Ex. 1, except that the amount of the solvent, the type and amount of the polymerization initiator, the amount of the solvent for washing the addition line, the polymerization time and the polymerization pressure were changed as shown in Table 1. The results are shown in Table 1.

(Ex. 4)

A fluorinated polymer was obtained in the same manner as in Ex. 2, except that the internal volume of the autoclave, the amounts of the monomer and solvent, the type, amount and addition interval of the polymerization initiator, the type and amount of the solvent for washing the addition line, the polymerization time and the polymerization pressure were changed as shown in Table 1. The results are shown in Table 1.

(Ex. 5)

In a stainless steel autoclave having an inner volume of 125 mL, 5.77 g of compound (C1-1), 74.62 g of compound (C2-1), 8.44 g of compound (B1) as a solvent, 24.0 mg of a 50 mass % solution of compound (A4) dissolved in compound (B2), were charged and deaerated thoroughly under cooling with liquid nitrogen. After the temperature was raised to 55° C., TFE was introduced, to bring the pressure to be 0.88 MPaG. While maintaining the temperature and pressure to be constant, TFE was continuously supplied. After 2.5 hours from the initiation of polymerization, the autoclave was cooled to terminate the polymerization reaction.

After withdrawing the content from the autoclave, the ceiling, wall surfaces and stirring shaft which were in contact with the gas phase in the container, were observed. The results are shown in Table 1.

The product withdrawn from the autoclave was diluted with compound (B2), and compound (B3) was added thereto to agglomerate the polymer, followed by filtration. The polymer was stirred in compound (B2), then re-agglomerated with compound (B3), and dried at 80° C. under reduced pressure overnight. The yield of the obtained fluorinated polymer, the proportion of structural units based on the fluorinated monomer (C), the ion exchange capacity, TQ, the polymerization rate Rp and the productivity are in Table 1.

(Ex. 6)

A fluorinated polymer was obtained in the same manner as in Ex. 1 except that the amount of the monomer, the type and amount of the solvent, the amount of the polymerization initiator, the amount of the solvent for washing the addition line, the polymerization time and the polymerization pressure were changed as shown in Table 2. The results are shown in Table 2.

(Ex. 7)

A fluorinated polymer was obtained in the same manner as in Ex. 2, except that the type and amount of the solvent, the amount of the polymerization initiator and the polymerization pressure were changed as shown in Table 2. The results are shown in Table 2.

(Ex. 8)

A fluorinated polymer was obtained in the same manner as in Ex. 5, except that the amount of the monomer, the type and amount of the solvent, the amount of the polymerization initiator, the polymerization time and the polymerization pressure were changed as shown in Table 2. The results are shown in Table 2.

(Ex. 9)

A fluorinated polymer was obtained in the same manner as in Ex. 2, except that the internal volume of the autoclave, the amount of the monomer, the type and amount of the solvent, the type, amount and addition interval of the polymerization initiator, the type and amount of the solvent for washing the addition line, the polymerization time and the polymerization pressure were changed as shown in Table 2. The results are shown in Table 2.

(Ex. 10)

A fluorinated polymer was obtained in the same manner as in Ex 2, except that the internal volume of the autoclave, the amount of the monomer, the type and amount of the solvent, the type, amount and addition interval of the polymerization initiator, the amount of the solvent for washing the addition line, the polymerization temperature, the polymerization time and the polymerization pressure were changed as shown in Table 2. The results are shown in Table 2.

(Ex. 11)

A fluorinated polymer was obtained in the same manner as in Ex. 1, except that the internal volume of the autoclave, the amount of the monomer, the type and amount of the solvent, the type and amount of the polymerization initiator, the type and amount of the solvent for washing the addition line, the polymerization temperature, the polymerization time, and the polymerization pressure were changed as shown in Table 2. The results are shown in Table 2.

(Ex. 12)

A fluorinated polymer was obtained in the same manner as in Ex. 5, except that the internal volume of the autoclave, the type and amount of the monomer, the type and amount of the solvent, the amount of the polymerization initiator, the type and amount of the solvent for washing the addition line, the polymerization temperature, the polymerization time and the polymerization pressure were changed as shown in Table 3. The results are shown in Table 3.

(Ex. 13)

A fluorinated polymer was obtained in the same manner as in Ex. 5, except that the internal volume of the autoclave, the type and amount of the monomer, the type and amount of the solvent, the amount of the polymerization initiator, the type and amount of the solvent for washing the addition line, the polymerization temperature, the polymerization time and the polymerization pressure were changed as shown in Table 3. The results are shown in Table 3.

TABLE 1

| | | | Ex. 1 | Ex. 2 | Ex. 3 | Ex. 4 | Ex. 5 |
|---|---|---|---|---|---|---|---|
| Inner volume of container | | mL | 2575 | 2575 | 2575 | 1006 | 125 |
| Charges | Compound (C1-1) | g | 1959 | 1959 | 1959 | 787 | 5.77 |
| | Compound (C2-1) | g | — | — | — | — | 74.62 |
| | Compound (B1) | g | 36.18 | 36.16 | 36.15 | 10 | 8.44 |
| | Compound (B2) | g | — | — | — | — | — |
| | Compound (B'4) | g | — | — | — | — | — |
| | Boiling point of fluorinated solvent | °C. | 15 | 15 | 15 | 15 | 15 |
| Polymerization initiator | Compound (A1) | mg | 699 | — | — | — | — |
| | Compound (A2) | mg | — | 425 | 699 | — | — |
| | Compound (A3) | mg | — | — | — | 80 | — |
| | Compound (A4) | mg | — | — | — | — | 12 |
| | Compound (A'5) | mg | — | — | — | — | — |
| | Compound (A'6) | mg | — | — | — | — | — |
| | Addition method | — | At once | Sequential | At once | Sequential | At once |
| | Addition interval | hr | — | 4 | — | 1 | — |
| | Addition times (total) | times | 1 | 3 | 1 | 10 | 1 |
| | Solution amount in 1st time | g | 1.40 | 3.52 | 4.95 | 3.18 | 0.024 |
| | Solution amount in 2nd and subsequent times | g | — | 3.52 | — | 1.94 | — |
| | Solvent for polymerization initiator | — | Compound (B2) | Compound (B2) | Compound (B2) | Compound (B2) | Compound (B2) |
| | Boiling point of solvent | °C. | 56 | 56 | 56 | 56 | 56 |
| | Concentration of polymerization initiator | mass % | 49.9 | 12.1 | 14.1 | 2.5 | 50 |
| | Solvent for washing addition line | g | 3 | 3 | 4.25 | 1 | — |
| | | — | Compound (B2) | Compound (B2) | Compound (B2) | Compound (C1-1) | — |
| Conditions | Polymerization temperature | °C. | 40 | 40 | 40 | 40 | 55 |
| | Nitrogen | MPa | 0.102 | 0.104 | 0.101 | 0.106 | — |
| | Total pressure | MPaG | 0.582 | 0.594 | 0.571 | 0.606 | 0.88 |
| | Polymerization time | hr | 14.0 | 13.0 | 12.0 | 10.5 | 2.50 |
| Results | Deposition state | — | ○ | ○ | ○ | ○ | ○ |
| | Yield | g | 207.0 | 250.7 | 172.7 | 200.0 | 5.5 |
| | Proportion of structural units of fluorinated monomer (C) | mol % | 27.2 | 27.1 | 27.6 | 24.4 | 18.0 |
| | Ion exchange capacity | meq/g | 1.40 | 1.40 | 1.41 | 1.32 | 1.79 |
| | TQ | °C. | 260 | 239 | 241 | 223 | 245 |
| | Mass average molecular weight | ×10,000 | 35 | 25 | 31.4 | 24.4 | 28 |
| | Polymerization rate Rp | g/L · h | 12.8 | 16.6 | 12.4 | 41.2 | 43.0 |
| | Productivity | — | ○ | ○ | ○ | ○ | ○ |

TABLE 2

|  |  |  | Ex. 6 | Ex. 7 | Ex. 8 | Ex. 9 | Ex. 10 | Ex. 11 |
|---|---|---|---|---|---|---|---|---|
|  | Inner volume of container | mL | 2575 | 2575 | 125 | 1006 | 230 | 230 |
| Charges | Compound (C1-1) | g | 2000 | 1959 | 26.66 | 787 | 175 | 170 |
|  | Compound (C2-1) | g | — | — | 45.54 | — | — | — |
|  | Compound (B1) | g | — | — | — | — | — | — |
|  | Compound (B2) | g | — | — | 12.82 | — | — | — |
|  | Compound (B'4) | g | — | — | — | — | — | 3.0 |
|  | Boiling point of fluorinated solvent | °C. | — | — | 56 | — | — | 71 |
| Polymerization initiator | Compound (A1) | mg | 935 | — | — | — | — | — |
|  | Compound (A2) | mg | — | 627 | — | — | — | — |
|  | Compound (A3) | mg | — | — | — | 84 | — | — |
|  | Compound (A4) | mg | — | — | 8.5 | — | — | — |
|  | Compound (A'5) | mg | — | — | — | — | 177 | — |
|  | Compound (A'6) | mg | — | — | — | — | — | 26 |
|  | Addition method | — | At once | Sequential | At once | Sequential | Sequential | At once |
|  | Addition interval | hr | — | 4 | — | 1 | 2 | — |
|  | Addition times (total) | times | 1 | 3 | 1 | 12 | 2 | 1 |
|  | Solution amount in 1st time | g | 5.61 | 5.23 | 0.85 | 3.36 | 3.53 | 2.63 |
|  | Solution amount in 2nd and subsequent times | g | — | 5.23 | — | 2.05 | 3.53 | — |
|  | Solvent for polymerization initiator | — | Compound (B2) | Compound (B2) | Compound (B2) | Compound (B2) | Compound (B2) | Compound (B'4) |
|  | Boiling point of solvent | °C. | 56 | 56 | 56 | 56 | 56 | 71 |
|  | Concentration of polymerization initiator | mass % | 16.7 | 12.0 | 1 | 2.5 | 5.0 | 2.63 |
|  | Solvent for washing addition line | g | 4.93 | 3 | — | 1 | 2 | 1 |
|  |  | — | Compound (B2) | Compound (B2) | — | Compound (C1-1) | Compound (B2) | Compound (B'4) |
| Conditions | Polymerization temperature | °C. | 40 | 40 | 55 | 40 | 50 | 60 |
|  | Nitrogen | MPa | 0.100 | 0.101 | — | 0.106 | 0.115 | 0.159 |
|  | Total pressure | MPaG | 0.565 | 0.571 | 0.790 | 0.606 | 0.665 | 0.959 |
|  | Polymerization time | hr | 11.7 | 13 | 4.25 | 12.7 | 4.0 | 9.0 |
| Results | Deposition state | — | x | Δ | x | x | ○ | ○ |
|  | Yield | g | 326.9 | 248.1 | 8.1 | 251.1 | 0 | 8.5 |
|  | Proportion of structural units of fluorinated monomer (C) | mol % | 28.1 | 27.9 | 19.8 | 23.9 | — | 27.1 |
|  | Ion exchange capacity | meq/g | 1.43 | 1.42 | 1.65 | 1.31 | — | 1.40 |
|  | TQ | °C. | 228 | 236 | 212 | 241 | — | 203 |
|  | Mass average molecular weight | ×10,000 | 24.7 | 25 | 12 | 31 | — | 21 |
|  | Polymerization rate Rp | g/L·h | 24.2 | 16.9 | 39.1 | 43.5 | 0 | 9.6 |
|  | Productivity | — | ○ | ○ | ○ | ○ | x | x |

TABLE 3

|  |  |  | Ex. 12 | Ex. 13 |
|---|---|---|---|---|
|  | Inner volume of container | mL | 230 | 1006 |
| Charges | Compound (C2-1) | g | 84.2 | — |
|  | Compound (C1-2) | g | 48 | — |
|  | Compound (C1-1) | | — | 542 |
|  | Compound (B5) | g | 8 | — |
|  | Compound (B6) | g | — | 151 |
|  | Boiling point of fluorinated solvent | °C. | 40 | 56 |
| Polymerization initiator | Compound (A1) | mg | — | — |
|  | Compound (A2) | mg | — | — |
|  | Compound (A3) | mg | — | — |
|  | Compound (A4) | mg | 5.6 | 27.5 |
|  | Compound (A'5) | mg | — | — |
|  | Compound (A'6) | mg | — | — |
|  | Addition method | — | At once | At once |
|  | Addition interval | hr | — | — |
|  | Addition times (total) | times | 1 | 1 |
|  | Solution amount in 1st time | g | 0.011 | 0.055 |
|  | Solution amount in 2nd and subsequent times | g | — | — |
|  | Solvent for polymerization initiator | — | Compound (B2) | Compound (B2) |
|  | Boiling point of solvent | °C. | 56 | 56 |
|  | Concentration of polymerization initiator | mass % | 50 | 50 |
|  | Solvent for washing addition line | g | 1 | 3 |
|  |  | — | Compound (B2) | Compound (B2) |
| Conditions | Polymerization temperature | °C. | 60 | 70 |
|  | Nitrogen | MPa | — | — |

TABLE 3-continued

|  |  |  | Ex. 12 | Ex. 13 |
|---|---|---|---|---|
| Results | Total pressure | MPaG | 0.920 | 1.10 |
|  | Polymerization time | hr | 7.9 | 6.3 |
|  | Deposition state | — | ○ | ○ |
|  | Yield | g | 20 | 90 |
|  | Proportion of structural units of fluorinated monomer (C) | mol % | 17.3 | 18.6 |
|  | Ion exchange capacity | meq/g | 1.06 | 1.13 |
|  | TQ | ° C. | 260 | 250 |
|  | Mass average molecular weight | ×10,000 | 25 | 24 |
|  | Polymerization rate Rp | g/L · h | 31 | 34 |
|  | Productivity | — | ○ | ○ |

In Ex. 1 to 5, 12 and 13, in the presence of a specific organic peroxide, in a polymerization medium containing at least one fluorinated solvent (B), a fluorinated monomer (C) and TFE were polymerized at a temperature of at most 70° C. and at least the boiling point at normal pressure of a fluorinated solvent (B) having the lowest boiling point at normal pressure among the fluorinated solvent (B), whereby the productivity of the fluoropolymer was good, the molecular weight of the obtainable fluorinated polymer was relatively high, and a fluorinated polymer having an extremely large proportion of structural units based on TFE was less likely to be formed as an impurity.

In Ex. 6 to 9, the polymerization temperature was lower than the boiling point at normal pressure of the fluorinated solvent (B), whereby a fluorinated polymer having an extremely large proportion of structural units based on TFE, was substantially formed as an impurity.

Ex. 10 is an Example wherein as a polymerization initiator, an organic peroxide which is other than the specific organic peroxide but is easily available, was used. Although the reason is not clearly understood, it was not possible to obtain a fluorinated polymer.

In Ex. 11, an azo compound was used as the polymerization initiator, whereby the productivity of the fluorinated polymer was poor.

INDUSTRIAL APPLICABILITY

A fluorinated polymer obtained by the production method of the present invention, is, when it has carboxylic acid type functional groups or sulfonic acid type functional groups, useful as a material for ion-exchange membranes (ion-exchange membranes for electrolysis of an alkali chloride, electrolyte membranes for fuel cells, etc.).

This application is a continuation of PCT Application No. PCT/JP2014/066575, filed on Jun. 23, 2014, which is based upon and claims the benefit of priority from Japanese Patent Application No. 2013-139999 filed on Jul. 3, 2013. The contents of those applications are incorporated herein by reference in their entireties.

What is claimed is:

1. A method for producing a fluorinated polymer, comprising:
    polymerizing at least one fluorinated monomer (C) in the presence of at least one organic peroxide (A) and tetrafluoroethylene;
    wherein:
    the polymerizing is carried out in a polymerization medium comprising at least one fluorinated solvent (B);
    the polymerizing is carried out in a container capable of polymerizing a monomer in a pressurized state;
    the at least one organic peroxide (A) is selected from the group consisting of a compound represented by formula (A1), a compound represented by formula (A2), a compound represented by formula (A3), and a compound represented by formula (A4):

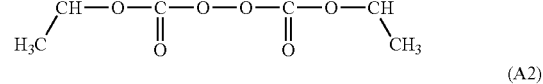

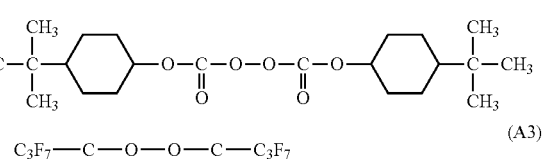

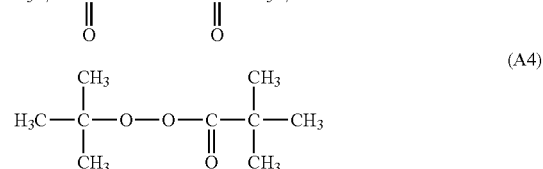

the at least one fluorinated solvent (B) has a boiling point at normal pressure of at most 60° C.;

the at least one fluorinated monomer (C) has a boiling point at normal pressure higher than the at least one fluorinated solvent (B);

the polymerizing is carried out at a temperature of at most 70° C. and at least the boiling point at normal pressure of the fluorinated solvent (B) having the lowest boiling point at normal pressure among the at least one fluorinated solvent (B).

2. The method according to claim 1, wherein:
    the fluorinated polymer contains 15 to 40 mol % of structural units based on the at least one fluorinated monomer (C); and
    a mass average molecular weight of the fluorinated polymer is at least 150,000.

3. The method according to claim 1, wherein the at least one fluorinated monomer (C) comprises at least one member selected from the group consisting of a compound represented by formula (C1) and a compound represented by formula (C2):

wherein:
X$^1$ is a fluorine atom or a trifluoromethyl group;
X$^2$ is a fluorine atom or a trifluoromethyl group;
A$^1$ is a carboxylic acid type functional group, a sulfonic acid type functional group, or a trifluoromethyl group;
p is 0 or 1;
q is 0 or 1;
r is an integer of from 0 to 3;
s is 0 or 1;
t is an integer of from 0 to 12; and
u is an integer of from 0 to 3;
provided 1≤r+u;

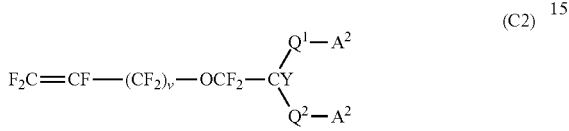
(C2)

wherein:
Q$^1$ is a perfluoroalkylene group which may have an etheric oxygen atom;
Q$^2$ is a single bond, or a perfluoroalkylene group which may have an etheric oxygen atom;
Y is a fluorine atom or a monovalent perfluoro organic group;
A$^2$ is a carboxylic acid type functional group, a sulfonic acid type functional group or a trifluoromethyl group; and
v is 0 or 1.

4. The method according to claim 1, wherein the boiling point at normal pressure of the at least one fluorinated solvent (B) is at least 10° C.

5. The method according to claim 1, wherein the ion exchange capacity of the fluorinated polymer is from 0.5 to 2.0 meq/g dry resin.

6. The method according to claim 1, wherein the at least one fluorinated monomer (C) comprises at least one member selected from the group consisting of a compound represented by formula (C1-1) and a compound represented by formula (C2-1):

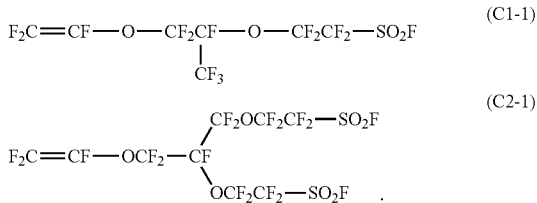

7. The method according to claim 1, wherein the at least one fluorinated solvent (B) comprises at least one of a hydrofluorocarbon and a hydrofluoroether.

8. The method according to claim 7, wherein
the hydrofluorocarbon comprises at least one member selected from the group consisting of CHF$_2$CH$_2$CF$_3$, CF$_3$CH$_2$CF$_2$CH$_3$, and CF$_3$CFHCFHCF$_2$CF$_3$; and
the hydrofluoroether is CF$_3$CH$_2$OCF$_2$CF$_2$H.

9. The method according to claim 1, wherein the at least one fluorinated solvent (B) comprises at least one member selected from the group consisting of CHF$_2$CH$_2$CF$_3$, CF$_3$CH$_2$CF$_2$CH$_3$, and CF$_3$CH$_2$OCF$_2$CF$_2$H.

10. The method according to claim 1, wherein:
the at least one fluorinated solvent (B) comprises at least one of CHF$_2$CH$_2$CF$_3$, CF$_3$CH$_2$CF$_2$CH$_3$, and CF$_3$CH$_2$OCF$_2$CF$_2$H; and
the at least one fluorinated monomer (C) comprises at least one member selected from the group consisting of a compound represented by formula (C1-1) and a compound represented by formula (C2-1):

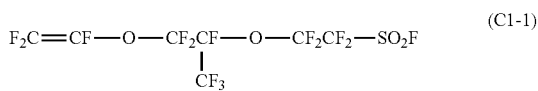
(C1-1)

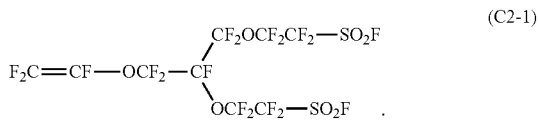
(C2-1)

11. The method according to claim 1, wherein the at least one organic peroxide (A) comprises the compound represented by formula (A1).

12. The method according to claim 1, wherein the at least one organic peroxide (A) comprises the compound represented by formula (A2).

13. The method according to claim 1, wherein the at least one organic peroxide (A) comprises the compound represented by formula (A3).

14. The method according to claim 1, wherein the at least one organic peroxide (A) comprises the compound represented by formula (A4).

15. The method according to claim 3, wherein the at least one fluorinated monomer (C) comprises a compound represented by formula (C1).

16. The method according to claim 3, wherein the at least one fluorinated monomer (C) comprises a compound represented by formula (C2).

17. The method according to claim 6, wherein the at least one fluorinated monomer (C) comprises the compound represented by formula (C1-1).

18. The method according to claim 6, wherein the at least one fluorinated monomer (C) comprises the compound represented by formula (C2-1).

19. The method according to claim 7, wherein the at least one fluorinated solvent (B) comprises a hydrofluorocarbon.

20. The method according to claim 7, wherein the at least one fluorinated solvent (B) comprises a hydrofluoroether.

* * * * *